US008579704B2

(12) United States Patent
Torres

(10) Patent No.: US 8,579,704 B2
(45) Date of Patent: Nov. 12, 2013

(54) MULTI-LEVEL PROGRESSIVE JACKPOT GAMING SYSTEMS AND METHODS

(75) Inventor: Jared A. Torres, Atlanta, GA (US)

(73) Assignee: Cadillac Jack, Duluth, GA (US)

( * ) Notice: Subject to any disclaimer, the term of this patent is extended or adjusted under 35 U.S.C. 154(b) by 1333 days.

(21) Appl. No.: 11/940,698

(22) Filed: Nov. 15, 2007

(65) Prior Publication Data

US 2009/0131160 A1 May 21, 2009

(51) Int. Cl.
*G06F 17/00* (2006.01)

(52) U.S. Cl.
USPC .......... 463/27

(58) Field of Classification Search
USPC .......... 463/42, 16–28
See application file for complete search history.

(56) References Cited

U.S. PATENT DOCUMENTS

| | | | | |
|---|---|---|---|---|
| 6,599,193 | B2 * | 7/2003 | Baerlocher et al. | 463/27 |
| 7,578,740 | B2 * | 8/2009 | Marks et al. | 463/27 |
| 7,585,223 | B2 * | 9/2009 | Iddings et al. | 463/27 |
| 7,666,094 | B2 * | 2/2010 | Baerlocher et al. | 463/27 |
| 7,674,178 | B2 * | 3/2010 | Baerlocher et al. | 463/27 |
| 7,780,523 | B2 * | 8/2010 | Baerlocher et al. | 463/26 |
| 7,841,939 | B2 * | 11/2010 | Baerlocher et al. | 463/25 |
| 2003/0027625 | A1 * | 2/2003 | Rowe | 463/20 |
| 2006/0073887 | A1 * | 4/2006 | Nguyen et al. | 463/27 |
| 2008/0009344 | A1 * | 1/2008 | Graham et al. | 463/25 |
| 2009/0088241 | A1 * | 4/2009 | Reed et al. | 463/25 |

* cited by examiner

*Primary Examiner* — Ronald Laneau

(57) ABSTRACT

Various embodiments of progressive gaming systems and methods are disclosed. One method embodiment, among others, comprises enabling a player an opportunity to win, at a time corresponding to a game play session, a first progressive award that is based on wagers collected from machines associated with game play, an amount of the first progressive award augmented with data corresponding to the wagers, the data received over a wide area network, and enabling the player an opportunity to win, at a time corresponding to the game play session, a second progressive award that is based on wagers collected from machines associated with game play, an amount of the second progressive award augmented with data corresponding to the wagers, the data received over a local area network.

13 Claims, 10 Drawing Sheets

MULTI-LEVEL PROGRESSIVE JACKPOT GAMING SYSTEMS AND METHODS

TECHNICAL FIELD

The present disclosure relates to gaming systems, and more particularly, to electronic gaming systems.

BACKGROUND

Gaming machines such as mechanically driven slot machines have been a staple of the gaming and entertainment industries for years. With the advent of computers, electronic forms of gaming machines such as video slots, video bingo, video poker, video keno and video blackjack have emerged and become increasingly popular. Such electronic devices continue to grow in popularity with the development of enhanced computer-generated graphics and sounds, making them more attractive to a wider audience of participants.

With the recent growth in the electronic gaming machine market, competition between manufacturers to place their equipment in available venues has become fierce. When selecting which machines to put into their facilities, the operators of gaming establishments give substantial consideration to their patrons' perception of a game as entertaining and exciting.

To attain this goal, casinos frequently employ progressive gaming systems in which gaming machines are linked together to allow players to compete for a common award or "progressive jackpot" in addition to the prizes paid for play at the individual gaming machines. In such systems, a plurality of gaming machines are electronically linked to a central progressive controller or server which augments the progressive jackpot by a portion of the amount of money bet at each of the linked machines. The jackpot grows rapidly because multiple players are contributing to the jackpot at the same time. The amount of the jackpot is displayed at the individual gaming machines, on a central display or both. When one of the linked gaming machines hits a predetermined outcome (e.g., a certain arrangement of symbols on a slot machine), the progressive jackpot is awarded to the player obtaining the winning outcome.

Gaming machine systems employing such progressive jackpots are well known in the art. For example, one system teaches a progressive jackpot system in which a proportion of the jackpot is awarded to eligible players at each linked machine. Data from each of a group of linked slot machines is sent to a central controller which determines the value of the progressive jackpot by accumulating a predetermined fraction of the money bet at each linked machine. When a progressive jackpot-winning outcome occurs at one of the linked machines, the winning machine signals the controller, which then announces the win.

A variation of the typical progressive jackpot gaming system is the so-called "secret" progressive jackpot. In such a system, the winning gaming machine is the one that causes the progressive jackpot to reach an unknown, predetermined value, as opposed to the typical winning combination. In such a system, the game controller, using a random number generator, establishes a jackpot-win amount between maximum and minimum values. The controller also establishes an initial base or "seed" value for the progressive jackpot. The jackpot amount is incremented each time a game is played at one of the linked gaming machines.

After each increment of the jackpot, the controller compares the new jackpot value with the previously established jackpot-win value. If the new value is less than a jackpot-win value, the controller merely updates the jackpot value. When an increment to the current jackpot value causes the value to reach or become equal to the predetermined jackpot-win value, the result is communicated to the winning linked gaming machine and the appropriate payment of the jackpot-win amount is made to the player.

One need with these and other systems is that of attracting new players through exciting game features. Another need is that of encouraging continued play by players already using the games.

SUMMARY

Various embodiments of progressive gaming systems and methods are disclosed. One method embodiment, among others, comprises enabling a player an opportunity to win, at a time corresponding to a game play session, a first progressive award that is based on wagers collected from machines associated with game play, an amount of the first progressive award augmented with data corresponding to the wagers, the data received over a wide area network, and enabling the player an opportunity to win at a time corresponding to the game play session a second progressive award that is based on wagers collected from machines associated with game play, an amount of the second progressive award augmented with data corresponding to the wagers, the data received over a local area.

Other systems, methods, features, and advantages of the present disclosure will be or become apparent to one with skill in the art upon examination of the following drawings and detailed description. It is intended that all such additional systems, methods, features, and advantages be included within this description, and be within the scope of the present disclosure.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the disclosed systems and methods. Moreover, in the drawings, like reference numerals designate corresponding parts throughout the several views.

DETAILED DESCRIPTION

Disclosed herein are various embodiments of progressive jackpot gaming systems and methods (herein, collectively progressive gaming systems). Such progressive gaming systems accumulate credits or monetary amounts in progressive jackpots (herein, also simply jackpots) stored in memory and award multiple levels of progressive jackpot awards (herein, also simply progressive awards or the like) in addition to any awards paid by an individual gaming machine of the gaming system. In particular, multiple progressive jackpots are seeded and then augmented in value by data communicated from remotely-located gaming machines over a wide area network ("wide area progressive") and also from gaming machines communicating over a local area network ("local area progressive"). The jackpot amounts associated with such multi-level progressives (i.e., combined wide area and local area progressive systems) are simultaneously displayed in a graphics user interface (GUI) associated with a game, enabling a player to see and play for local and wide area progressive jackpot awards.

In one embodiment, the local area progressive jackpot is augmented by a percentage of the amount wagered on each of the gaming machines connected to the local area network. Similarly, the wide area progressive jackpot is augmented by a percentage of the amount wagered on each of the machines coupled to one or more game servers, the one or more game servers connected to the wide area network. The values of the local area and wide area progressive jackpots are the same with respect to each game connected thereto. The exact amount by which a jackpot is progressed depends on the percentage of coin-in (i.e., wagers) programmed into the software controlling the game play. Payout of money or credits associated with the progressive jackpots is tied to the occurrence of a gaming event (e.g., in a reel or video slot game, the matching of symbols according to a predefined pattern, as explained further below). Such a system increases excitement of play.

The present disclosure now will be described more fully hereinafter with reference to the accompanying drawings, in which some, but not all embodiments are shown. Although shown in the context of a video slots game, other types of games are contemplated to be within the scope of the embodiments. Indeed, the disclosed systems and methods may be embodied in many different forms and should not be construed as limited to the embodiments set forth herein. Rather, these embodiments are provided so that this disclosure will satisfy applicable legal requirements.

Figure 1:
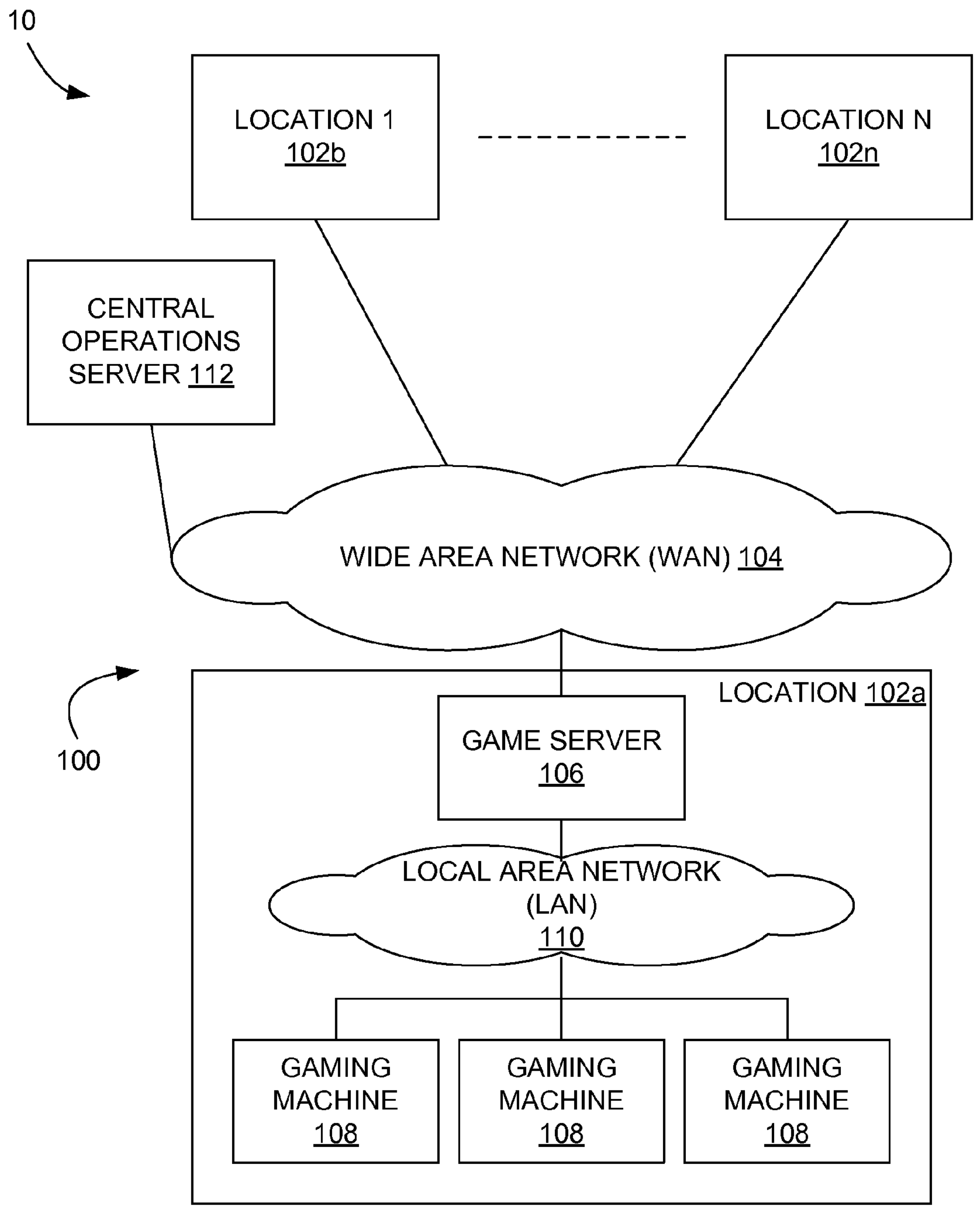
FIG. 1 is a block diagram of an exemplary environment in which an embodiment of a progressive gaming system is implemented.

FIG. 1 is a block diagram of an exemplary environment 10 in which an embodiment of a progressive gaming system 100 is implemented. The environment 10 comprises multiple locations 102 (e.g., 102*a* through 102*n*) communicatively coupled through a wide area network (WAN) 104. Each location 102 may be a casino or other facility participating in gaming operations. Further, each location 102 may comprise one or more game servers 106, and one or more gaming machines 108 communicatively coupled over a local area network (LAN) 110, such as through an Ethernet connection. In one embodiment, hardware and/or software necessary to implement the functionality of the progressive gaming system 100 collectively resides in a game server 106, in a central operations server 112 (explained below), and the gaming machines 108, although in some embodiments, functionality of the progressive gaming system may reside primarily in fewer than all of these components.

The progressive gaming system 100 comprises a central operations server 112, which provides initial or seed values for the wide area progressive (e.g., as communicated through the respective game server 106 of each location 102). The central operations server 112 also receives wager-related data from multiple locations 102 over the WAN 104, processes the wager-related data to provide one or more wide area progressive jackpots to the game servers 106 of the multiple locations 102. The value of the wide area and local area progressive jackpots are communicated from the game server(s) 106 at each location 102 to the gaming machines 108. The progressive jackpots displayed at each respective gaming machine 108 are continuously updated either via polling mechanisms (e.g., the gaming machines 108 request updates from the game server 106, which requests WAN-based progressive award updates at the central operations server 112), or in some embodiments, periodically being updated by the respective game server 106 (which in turn is updated by the central operations server 112).

For instance, as wagers are made at the various gaming machines 108 at a given location 102, data corresponding to the wagers is uploaded over the respective LAN 110 to the game server 106. The game server 106 responsively processes the wager-related data from one or more gaming machines 108 coupled to the LAN 110, determines the amount by which to augment the local area progressive jackpot based on a percentage of the wagers, and updates the progressive jackpot(s) that is displayed on each respective gaming machine 108. Further, each game server 106 in the environment 10 provides the wager-related data over the WAN 104 to the central operations server 112, which similarly processes the data, and returns data corresponding to one or more progressive jackpots over the WAN 104 back to the game servers 106 at each location 102. The game servers 106 provide the wager-related data to the central operations server 112 periodically, or in some embodiments, based on threshold wager amounts at collective gaming machines. One having ordinary skill in the art should understand, in the context of the present disclosure, that other triggers may be used to prompt game servers 106 to send updated values based on wager activity at a given gaming machine 108. The game servers 106 update the progressive jackpot amounts that are displayed on each respective gaming machine 108.

In one embodiment, the game servers 106 provide a graphics user interface (GUI) that includes the progressive jackpot amounts to each gaming machine 108. In some embodiments, the game server 106 provides the data to be populated in a GUI presented on each gaming machine 108, with the GUI generation and formatting mechanisms residing in one or more gaming machines 108.

Figure 2:
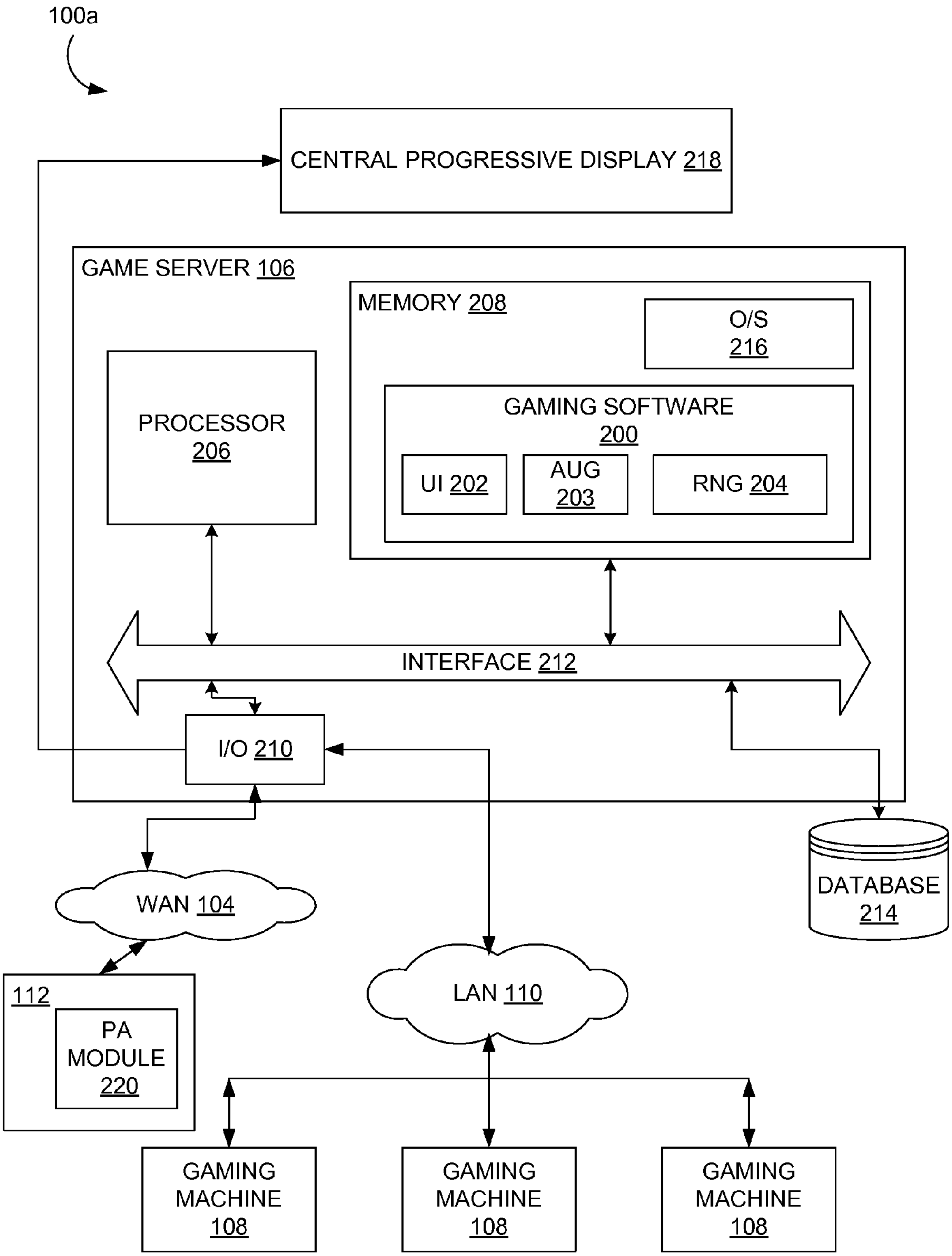
FIG. 2 is a block diagram that illustrates an embodiment of the progressive gaming system as employed at an exemplary location within the environment shown in FIG. 1.

Having described an exemplary environment 10 in which a progressive gaming system 100 is implemented, reference is now made to FIG. 2, which is a block diagram that illustrates an embodiment of a progressive gaming system 100*a* as employed at an exemplary location 102, with the understanding that a similar arrangement may be implemented at other locations, though not limited to such configurations. The progressive gaming system 100*a* includes the game server 106 networked to one or more individual gaming machines 108 via the LAN 110. The game server 106 is also networked to a plurality of other game servers (not shown) residing at other locations 102 coupled to the WAN 104, as well as coupled to the central operations server 112. The central operations server 112 comprises a progressive award module 220, which includes functionality for generating an initial or seed value for a wide area progressive amount, and other processing functionality to augment wide area progressive jackpots based on the wager-related data provided by one or more game servers 106.

In one embodiment, the game server 106 can implement gaming software 200. The gaming software 200, as is true with the progressive award module 220, can be implemented in software, as an executable program, and can be executed by a special or general purpose digital computer, such as a personal computer (PC; IBM-compatible, Apple-compatible, or otherwise), workstation, minicomputer, or mainframe computer. The gaming software 200 includes a user-interface (UI) module 202 that provides display functionality (e.g., a graphics user interface (GUI)) for display at respective gaming machines 108, hence providing in one embodiment a mechanism to enable players to play various games. As explained above, in some embodiments, GUI functionality may reside in each respective gaming machine 108 (in lieu of or in combination with the UI module 202), with data corresponding to at least one wide area jackpot communicated to each gaming machine 108 by a module (e.g., UI module 202) of the game server 106 in cooperation with an appropriate communications interface (e.g., I/O module 210). In one embodiment, the gaming software 200 also includes a random number generator (RNG) 204. The RNG 204 comprises one or more modules of code configured to generate and assign a seed value to the respective local area progressive. In some embodiments, RNG functionality can be implemented in hardware, or as a combination of hardware and software. In some embodiments, seed values may simply be a pre-defined number, as opposed to randomly generated. For example, responsive to a progressive payout, the initial or seed value is reset to the pre-defined number. Such a predefined number may be programmed into the gaming software 200 (e.g., via augmentation (AUG) module 203) or via the gaming machine software or hardware. The gaming software 200 further includes the augmentation module 203, which is used to augment the local area progressive jackpots based on wagers (e.g., a percentage of the wagers) provided at each respective local area coupled gaming machine. The PA module 220 performs similar functionality pertaining to generation of initial or seed values and augmentation, as is described further below.

Although shown integral to the gaming software 200, one having ordinary skill in the art should understand in the context of the present disclosure that the UI module 202, AUG module 203, and/or RNG 204 can be configured as modules distinct from the gaming software 200, and that each module may be further configured using a plurality of submodules. Further, as indicated above, in some embodiments, some or all of the functionality of the gaming software 200 may reside in (and hence be implemented by) the gaming machines 108, or distributed among the gaming machines 108 and the game server 106.

Generally, in terms of hardware architecture, as shown in FIG. 2, the game server 106 includes a processor 206, memory 208, and one or more input and/or output (I/O) devices or peripherals 210 that are communicatively coupled via a local interface 212. The local interface 212 can be, for example, one or more buses or other wired or wireless connections. The local interface 212 may have additional elements (not shown) to enable communications, such as controllers, buffers (caches), drivers, repeaters, and receivers. Further, the local interface 212 may include address, control, and/or data connections to enable appropriate communications among the aforementioned components. Also included external to (or integral to, in some embodiments) the game server 106 is a database 214, which in one embodiment may be coupled to other components of the game server 106 via the local interface 212.

The processor 206 is a hardware device capable of executing software, particularly that stored in memory 208. The processor 206 can be any custom made or commercially available processor, a central processing unit (CPU), an auxiliary processor among several processors associated with the game server 106, a semiconductor based microprocessor (in the form of a microchip or chip set), a macroprocessor, or generally any device for executing software instructions.

Memory 208 can include any one or combination of volatile memory elements (e.g., random access memory or RAM) such as DRAM, SRAM or SDRAM and non-volatile memory elements (e.g., read only memory or ROM) such as a hard drive, tape or CDROM. Moreover, the memory 208 may incorporate electronic, magnetic, optical, and/or other types of storage media. Note that memory 208 can have a distributed architecture, where various components are situated remote from one another, but can be accessed by the processor 206.

The software in memory 208 may include one or more separate programs, each of which comprises an ordered listing of executable instructions for implementing logical functions. In one example of the game server 106 of FIG. 2, the software in memory 208 includes the gaming software 200 and a suitable operating system (O/S) 216. The operating system 216 essentially controls the execution of other computer programs, such as the gaming software 200, and provides scheduling, input-output control, file and data management, memory management, and communication control and related services.

The gaming software 200 (and the progressive award module 220, as explained below) can be a source program, executable program (object code), script, and/or any other entity comprising a set of instructions to be performed. In the case of a source program, the program may be translated via a compiler, assembler, interpreter or the like, which may or may not be included within memory 208, so as to operate properly in connection with the operating system 216. Furthermore, the gaming software 200 can be written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, ASP, and Ada.

The I/O devices 210 may include input devices, such as a keyboard, mouse, scanner, microphone, etc., as well as interfaces to various devices (e.g., an interface to one or more central progressive displays 218). Furthermore, the I/O devices 210 may also include output devices, such as a printer, display, etc. Finally, the I/O devices 210 may further include devices that communicate both inputs and outputs, for instance a modulator/demodulator (modem for accessing another device, system, or network), a radio frequency (RF) or other transceiver, a telephonic interface, a bridge, a router, etc. for communication over the LAN 110 and WAN 104.

When the game server 106 is in operation, the processor 206 is configured to execute software stored within memory 208, to communicate data to and from memory 208, and to generally control operations of the game server 106 pursuant to the software. The gaming software 200 and the operating system 216, in whole or in part, but typically the latter, are read by the processor 206, perhaps buffered within the processor 206, and then executed.

The gaming software 200 (and progressive award module 220, explained below) can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The gaming software 200 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In one embodiment, the central progressive display 218 for displaying the current value of the progressive jackpot is connected to the I/O interface 210. In one embodiment, the progressive display 218 is a large screen plasma monitor. Such monitors are extremely thin, making them particularly suitable for mounting at an elevation above the gaming machines and allowing the progressive display 218 to be viewed by a large audience of individuals. However, the progressive display 218 can, in the alternative, be a CRT, LCD or any other type of display known in the art.

In one embodiment, the central operations server 112 is configured similarly (e.g., in architecture, software functionality, etc.) to the game server 106, with the gaming software 200 replaced with the WAN-based progressive award module 220 that receives wager related data from one or more game servers 106 of the environment 10, and provides data to the game servers 106 corresponding to the wide area progressive award amount that is to be displayed at each respective gaming machine 108 (and on the central progressive display 218 where included). The progressive award module 220 also includes seed value generation functionality for generating and assigning seed values for the wide area progressive (e.g., WAN-based) award for an initial wide area progressive award amount to be displayed at each gaming machine (and on the central display 218 where included).

Figure 3:
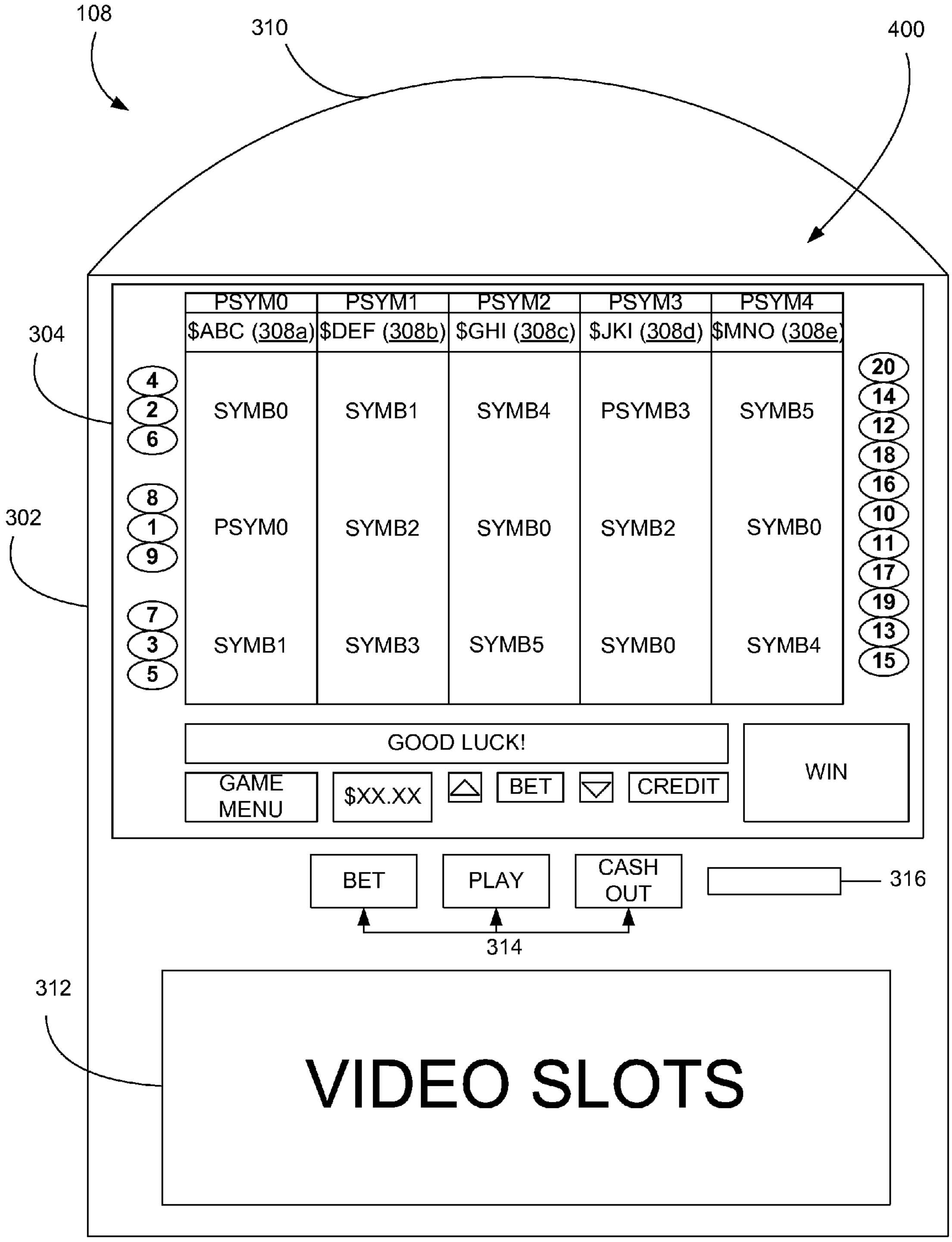
FIG. 3 shows an exemplary gaming machine residing at the location shown in FIG. 2 in which a player interacts with a progressive gaming system.

FIG. 3 depicts an embodiment of a video gaming machine 108. It is noted that the term "gaming machine" may refer to any device, activity or mode of play for gaming (i.e., gambling or redemption), amusement, competition, or other purposes. Additionally, "gaming machine" may refer to a "stand alone" player station or console in which case the outcome of game play is determined locally, or part of a server-based network of gaming machines in which case the outcome of game play can be centrally determined. The gaming machine 108 includes a cabinet 302 housing a primary display 304 for displaying game events. The primary display 304 comprises a video display such as a flat panel LCD as used in electronic games such as video bingo, video slots, video poker, video keno or video blackjack. In some embodiments, the primary display 304 may comprise a mechanical display such as used in traditional slot machines. In one embodiment, a graphics user interface (GUI) 400 is presented on the primary display 304 and includes the graphics for a game (e.g., a reel game, such as video slots), game information, and selectable button icons that enable user interaction with the game for game play, etc.

In addition, the GUI 400 includes multi-level progressive displays 308 (e.g., periodically updating or refreshing sub-windows or displays 308*a*-308*e*, herein simply referenced by symbols $ABC, $DEF, etc. as explained below) for displaying the value of the progressive jackpots based on gaming machines coupled to the LAN 110 and gaming machines from other locations communicating wager-related data (e.g., data corresponding to percentage of wagers) to the game server 106 over the WAN 104 (e.g., via the central operations server 112). In one embodiment, the GUI 400 is generated and formatted by the UI module 202 of the game server 106, although variations are contemplated to be within the scope of the disclosed embodiments. For instance, in some embodiments, the GUI 400 may be generated locally by the individual gaming machines 108, with the data corresponding to progressive award amounts provided to the gaming machine 108 by the game server 106. The gaming machine 108 may also include top glass 310 and belly glass 312 for displaying various information such as game rules or graphics designed to attract players to participate.

Proximate to the primary display 304 are a series of electromechanical buttons 314 positioned on the cabinet 302 for use as a user interface for controlling game play such as selecting a bet amount, commencing play and cashing out. The specific arrangement and function of each of the electromechanical buttons 314 is dependent upon the type of game being played on the gaming machine 108. For example, for a Blackjack game, the electromechanical buttons 314 may include options for placing a bet, cashing out, hitting or standing, doubling down, purchasing insurance and/or splitting. Alternatively, in a poker game, the electromechanical buttons 314 may include options for placing a bet, cashing out and/or designating which cards to keep and which to discard. In one embodiment, the primary display 304 is a "touch screen" upon which icons corresponding to some or all of the electromechanical buttons 314 appear. The user can activate the functions associated with the icons by simply touching the appropriate area of the primary display 304 rather than (or in addition to) depressing the electromechanical buttons 314.

The gaming machine 108 also includes a wager input interface 316, such as a bill acceptor into which a player inserts paper currency and receives credit on the gaming machine 108 for the amount deposited. In alternate embodiments, the wager input interface 316 can be a ticket reader, a magnetic card reader, or similar mechanisms, into which the player places a ticket or magnetic card encoded with a monetary value purchased from a cashier's station or vending machine.

Upon initial operation of the progressive gaming system 100*a*, initial or "seed" values are generated for the wide area progressive jackpot (e.g., at the central operations server 112 and communicated to the game servers 106 over the WAN 104) and the local area jackpot (e.g., generated at and assigned by the game server 106), and assigned to the respective multi-level progressive jackpots stored in memory (e.g., at the game server 106). In one embodiment, the seed values are selected from a range between maximum and minimum values defined by program instructions residing in the progressive award module 220 (of the central operations server 112) and the RNG 204 (of the game server 106). Note that in some embodiments, the seed values do not need to be randomly generated. For example, seed values can be predefined and programmed into the respective logic of the game server 106 (or central operations server 112), and hence, after the local area progressive hits, it is reseeded at some arbitrary amount such as $5.00. Similarly, the wide area progressive can be re-seeded at a predefined value, such as $500.00. Although the seed value may be zero, in some implementations, the seed value may be set at a significant amount to generate instant excitement and interest in the gaming machines 108 associated with the gaming system 100*a*. The seed values for the wide area progressive jackpot are communicated to the game servers 106, which in turn communicate wide area and local area-based seed values to the gaming machines 108 for display. In addition, the values are communicated to the central progressive display 218 where employed at a location 102.

Once the progressive jackpot seed values have been established, play of the individual gaming machines 108 commences. One exemplary manner of play is described below. For instance, the player places a wager by inputting currency or a ticket or magnetic card bearing game credits into wager input interface 316 of a gaming machine 108. In one embodiment, the gaming machine 108 indicates the amount of money or credit available for the player to bet during play. The player then proceeds to indicate the amount to be wagered on a particular play of the game, up to the lesser of the available game credits or the maximum allowable bet on the gaming machine 108. The player starts play of the game by selecting the appropriate choice among the electromechanical buttons 314 (and/or icons presented for selection in GUI 400). After the placing of a wager and commencement of play at the gaming machine 108, the player interacts with the game. Play of the game continues in typical fashion. A winning outcome results in the player receiving additional game credits. Conversely, a losing outcome results in the player's wager being forfeited.

As explained above, the progressive award amounts are periodically or continually augmented based on the wager amounts contributed to gaming machines 108 at one or more locations 102, and then reset with the same or different seed values responsive to a progressive payout. In one embodiment, the augmentation of the local area progressive jackpot (at a given location 102) is drawn from the same pool of wager contributions (e.g., from the gaming machines 108 at a given location 102), but at different percentages. For instance, in one implementation, an amount equivalent to one percent of the wagered bet at each gaming machine 108 is contributed to a local area progressive jackpot recorded at the respective game server 106 for a given location, and from that progressive award pool, different progressive award amounts pertaining to different bonus games (and hence different columns in a display for a video slot game, as explained below) are determined based on different percentages (e.g., 25% of the 1% for one bonus game, 15% of the 1% for a different bonus game, etc.). Similarly, data corresponding to the wager amounts (e.g., wager-related data) for a given location is communicated to the central operations server 112 over the WAN 104 from one or more locations 102, where the progressive award module 220 computes one or more progressive award amounts in similar fashion (e.g., different percentages) and provides data corresponding to the computed amounts to the different locations 102 for display at the respective gaming machines 108.

Figure 4A:
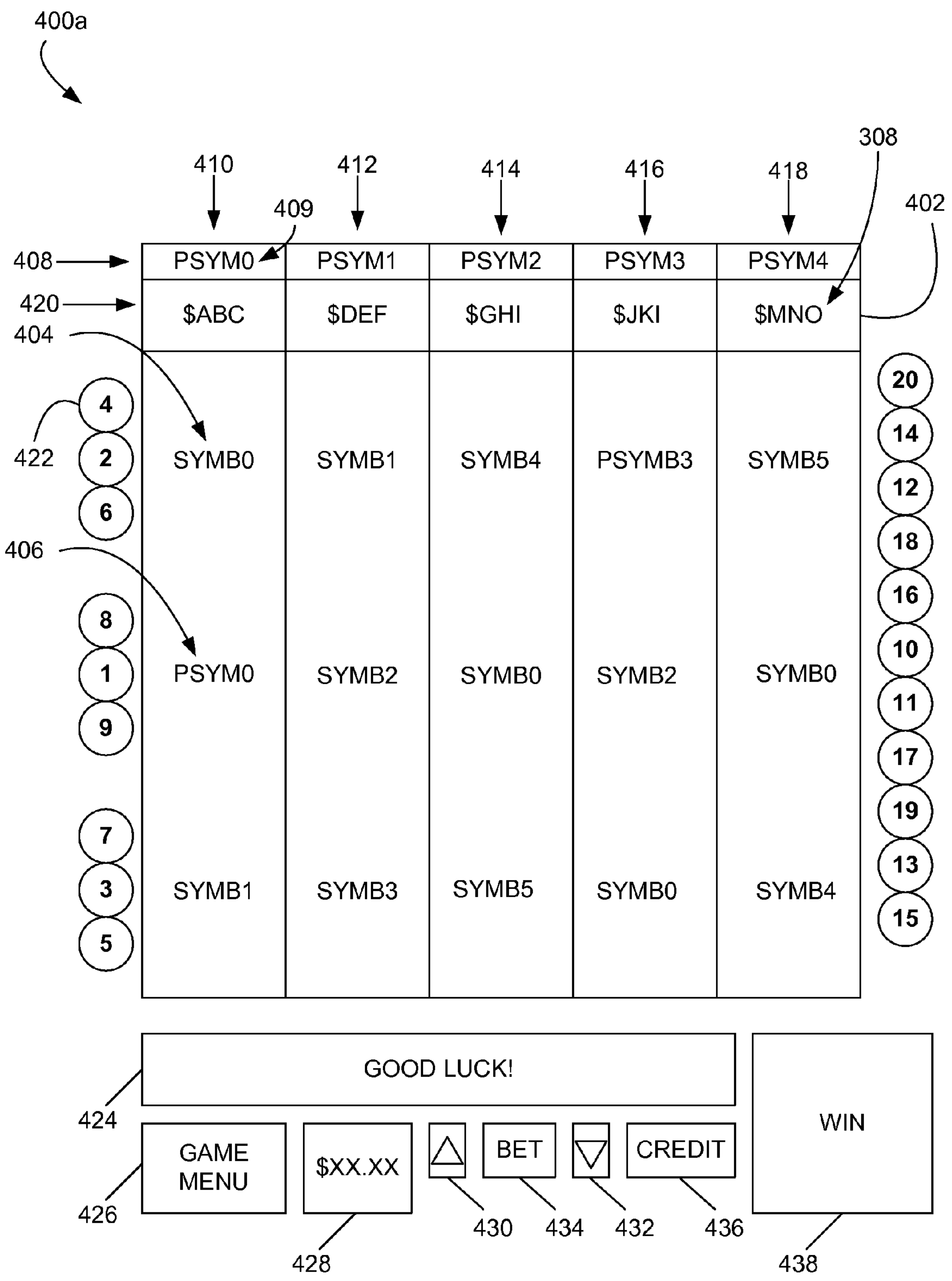
FIG. 4A is a screen diagram that illustrates an embodiment of a graphics user interface (GUI) through which a player interacts with an exemplary reel game in a game play session of the progressive gaming system.

FIGS. 4A-4D are screen diagrams that illustrate several exemplary GUIs 400 pertaining to a session of game play for a video slots game. Referring to FIG. 4A, shown is a GUI 400*a* that comprises a matrix 402 (e.g., columns and rows) of standard symbols 404 (e.g., "SYMBx, where x=0, 1, 2, 3, . . . etc.) and bonus or progressive symbols 406 (e.g., "PSYMx, where x=0, 1, 2, 3, . . . etc.) corresponding to the column symbols 409 in the progressive row 408. It should be appreciated that "SYMBx" is merely a manner of representing a graphical symbol, such as one or more of a dollar bill, a gold bar, a cherry, among other well-known game symbols. Similarly, the "PSYMx" represents a graphical symbol, such as a triple "1" (e.g., "111" overlaid on a graphical object, such as geometrical object like an oval or square or other object) or other symbols well-known in the art.

In one embodiment, the progressive symbols 406 only appear in the corresponding column of the column symbol 409 shown in the progressive row 408 (except during bonus rounds, as explained below). For instance, the progressive symbol 406 "PSYM0" only appears in the first column 410, labeled with the column symbol 409 "PSYM0." Similarly, the progressive symbol 406 "PSYM1" only appears in the second (e.g., second from the left hand side of the figure) column 412, labeled with the column symbol 409 "PSYM1;" the progressive symbol 406 "PSYM2" only appears in the third column 414, labeled with the column symbol 409 "PSYM2;" the progressive symbol 406 "PSYM3" only appears in the fourth column 416, labeled with the column symbol 409 "PSYM3;" and the progressive symbol 406 "PSYM4" only appears in the fifth column 418, labeled with the column symbol 409 "PSYM4. Note that in some embodiments, the progressive symbols 406 are not limited to the column labeled by the same column symbol 409. Further, although shown using five columns and three rows, other matrix or non-matrix configurations may be employed in some embodiments, as should be evident to one having ordinary skill in the art.

Shown beneath the progressive row 408 is a progressive jackpot award row 420 (comprising the multi-level progressive displays 308 in each column, as initially described in association with FIG. 3) that has multiple levels of progressive award amounts. For instance, in one configuration, columns 410, 412, and 414 may correspond to distinct local area progressive jackpots (e.g., $ABC, $DEF, and $GHI in progressive jackpot award row 420, where the letters A-H symbolically represent one or more of the same or different numbers as part of a monetary award, such as $450, where "A"=4, "B"=5, and "C"=0) corresponding to the initial seed value plus the respective percentages of the collective wage contributions at local gaming machines 108 of a given location 102. Further, columns 416 and 418 may correspond to distinct wide area progressive jackpots (e.g., $JKI, $MNO in progressive jackpot award row 420, where the letters J-O symbolically represent one or more of the same or different numbers as part of a monetary award, such as $1000, where "J"=10, "K"=0, and "I"=0).

Given the wider base of wagers contributed over multiple locations over a WAN 104, it is expected that augmentation of the wide area progressive jackpot (in progressive jackpot award row 420, columns 416 and 418) will increase at a faster rate (with a larger monetary value) than the local area jackpot displayed in progressive jackpot award row 420, columns 410, 412, and 414. Note that other arrangements may be made, as should be appreciated by one having ordinary skill in the art in the context of the present disclosure. For instance, there may be only two different award amounts displayed (e.g., one for WAN-based, one for LAN-based), or the WAN-based and LAN-based awards may be distributed in different columns or in a different number of columns, and not necessarily displayed in adjacent, contiguous columns.

Also shown are payline symbols 422 arranged, in one implementation, at the left hand and right hand sides of the matrix 402 (e.g., represented with circles surrounding a number). In one embodiment, and as shown, there are a total of twenty paylines. If a player obtains one of a designated combination of symbols along a payline upon which a wager has been placed, he or she will win a prize based upon the amount bet and the value of the designated symbol combination, as set forth in a pay table stored in one embodiment in database 214. Also included as part of the GUI 400*a* is informational display 424 (e.g., updated continually in one implementation to provide feedback of game progress), game menu option icon 426, wager display 428 with a corresponding button icon 430 to adjust the wager displayed in the wager display 428, a bet button display 434 with a corresponding button icon 432 to adjust the bet shown in the bet button display 434, a credit display 436 to inform the player as to the earned credits, and a win display 438 to provide feedback to the player as to the amount won for a given game. One having ordinary skill in the art should appreciate in the context of the present disclosure that other arrangements may be used and hence are contemplated to be within the scope of the present disclosure.

Figure 4B:
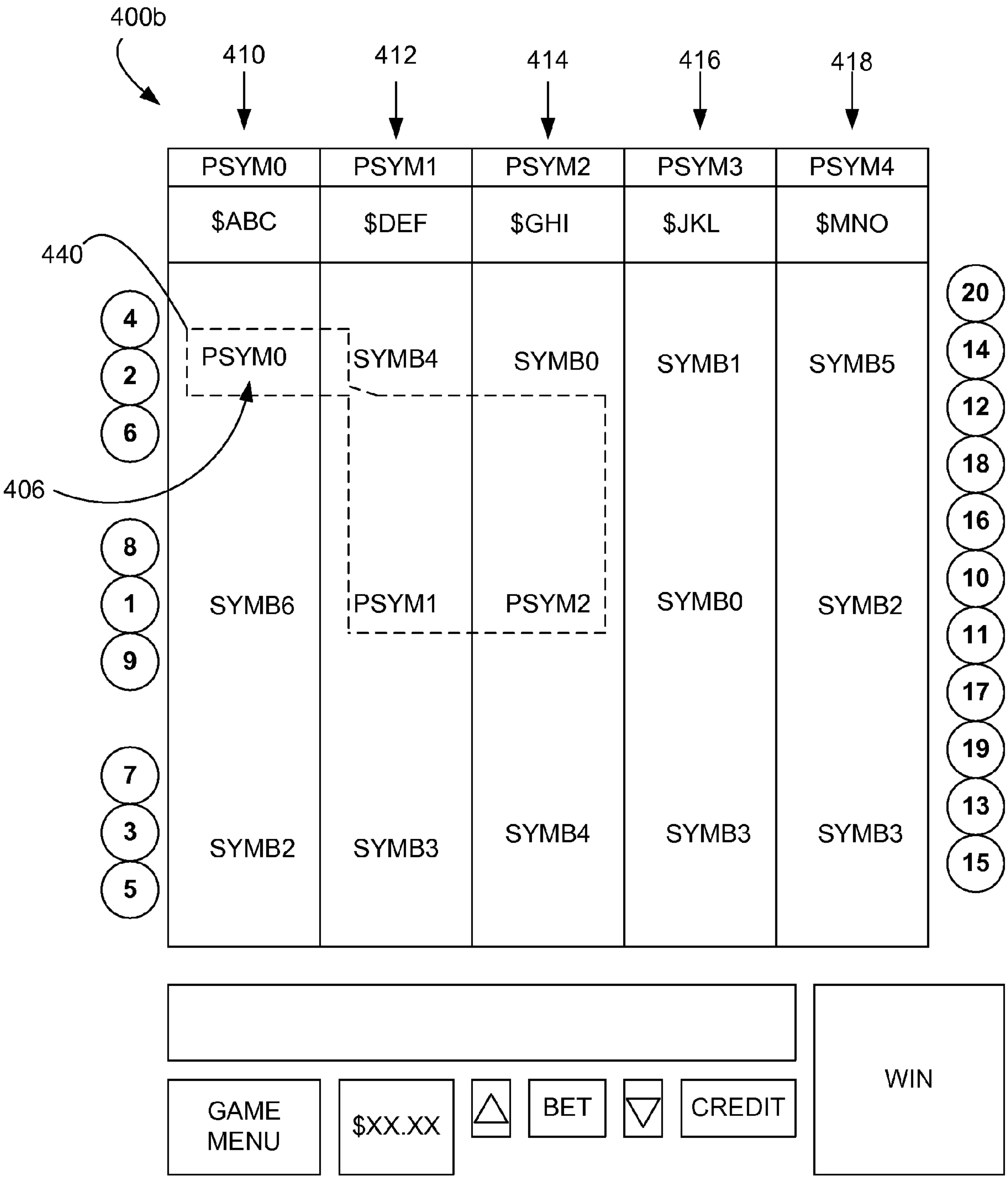
FIG. 4B is a screen diagram that illustrates a continuation of the session shown in FIG. 4A, where a player has earned an opportunity to play three progressive or bonus rounds of play.

Having described the basic features of the GUI 400*a*, attention is directed to FIG. 4B, which represents a GUI 400*b* responsive to a player "spinning" the reel or video slots shown in FIG. 4A. A discussion of one or more of similar features found in FIG. 4A is omitted here for brevity except as noted, with emphasis on a description of a session of game play. In one implementation of game play for a given session, among others, a player earns bonus rounds (and hence an opportunity to win one or more respective progressive awards for each column where the progressive symbol 406 is displayed) when at least three progressive symbols 406 appear in separate columns 410-418 (not necessarily in contiguous or adjacent columns). As shown in this example, three of the progressive symbols (encompassed by pattern 440 (shown encompassed with a dashed line) comprising PSYM0, PSYM1, and PSYM2) are displayed in columns 410, 412, and 414, respectively, resulting in the player earning a bonus play or "spin" for each corresponding column 410, 412, and 414.

Figure 4C:
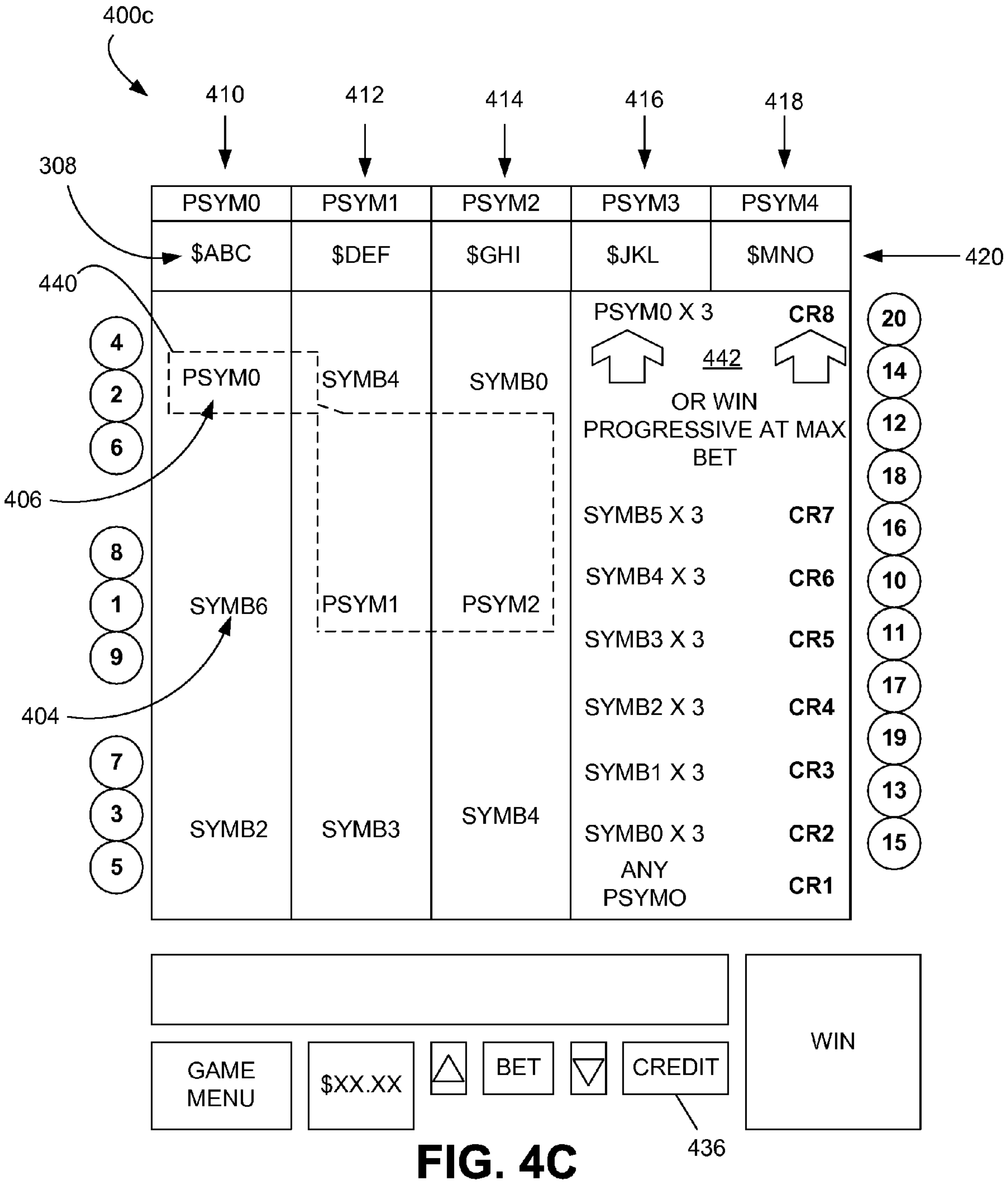
FIG. 4C is a screen diagram that illustrates a continuation of the session shown in FIG. 4B, where a pay table graphic is automatically prompted to commence a bonus round.

Responsive to the player obtaining the pattern 440, a GUI 400*c* is presented on the gaming machine 108 with a progressive overlay 442, in one embodiment, over the last two columns 416 and 418, as shown in FIG. 4C. In some embodiments, the progressive overlay 442 may be presented in other locations in the GUI 400*c*. The progressive overlay 442 is presented automatically, and may transition into the display according to any of several well-known mechanisms (e.g., fade-in, rise from the bottom of the screen, etc.). In some embodiments, the progressive overlay 442 may be prompted by a player according to selection of a button icon or mechanical interface (not shown). As shown, the progressive overlay 442 provides information to the player as to what patterns of symbols (both progressive symbols 406 and standard symbols 404) earn a player bonus credits and/or a progressive jackpot award for a given column 410-418 (e.g., in this example, for the column 410 comprising the progressive symbol PSYM0). For example, to win eight credits (denoted, "CR8" in the upper right hand corner of the progressive overlay 442), a game event (e.g., reel spin) must result in the progressive symbol 406, "PSYM0" appearing in each of the three columns, 410, 412 and 414 (denoted, "X 3" in the progressive overlay 442). Similarly, to win seven credits (e.g., CR7), a game event must result in three standard symbols 404 (SYMB5) appearing in each of the three columns, 410, 412 and 414. In one embodiment of the present disclosure, only the symbols appearing in the center row of columns 410, 412 and 414 are considered in determining if a the player has obtained a winning pattern designated in progressive overlay 442.

In general, to win a progressive jackpot, the player must i) obtain the designated combination of symbols (i.e., the first pattern indicated at the top of progressive overlay 442); and ii) put the most money possible at risk at the outset of play of the gaming machine 108. Usually, this is simply a matter of the player indicating his or her intent to the gaming machine 108 a desire to play the maximum number of paylines available on the gaming machine 108 (corresponding to payline symbols 422). Typically, the number of paylines ranges from 1 to 25, although in the exemplary GUI 400*c* shown in FIG. 4C, twenty paylines are shown. Each payline contains one (1) symbol in each of the five (5) columns 410-418. For example, payline 1 may pass through the middle row of symbols, payline 2 may pass through the top row of symbols and payline 3 may pass through the bottom row of symbols. After that, the lines must "zig-zag." Payline 4 may start in the upper left corner, go southeast one square and then due west. The number of paylines assigned to a particular gaming machine is a design decision based upon maximizing profits.

More specifically, in order to win the progressive, the player must obtain the winning symbols (e.g. three "PSYM0") and bet the maximum amount (i.e., the maximum denomination) permissible on a particular gaming machine and the maximum number of paylines available (represented by the circles 422). If the player obtains the winning symbols (i.e., three "PSYM0") but fails to bet the maximum amount, he or she simply wins the number of credits indicated by the progressive overlay 442.

One having ordinary skill in the art should understand, in the context of the present disclosure, that the symbols need not appear according to the pattern shown in the progressive overlay 442 in contiguous columns, as long as the symbols to earn the credits and/or progressive award appear in at least three distinct columns.

Figure 4D:
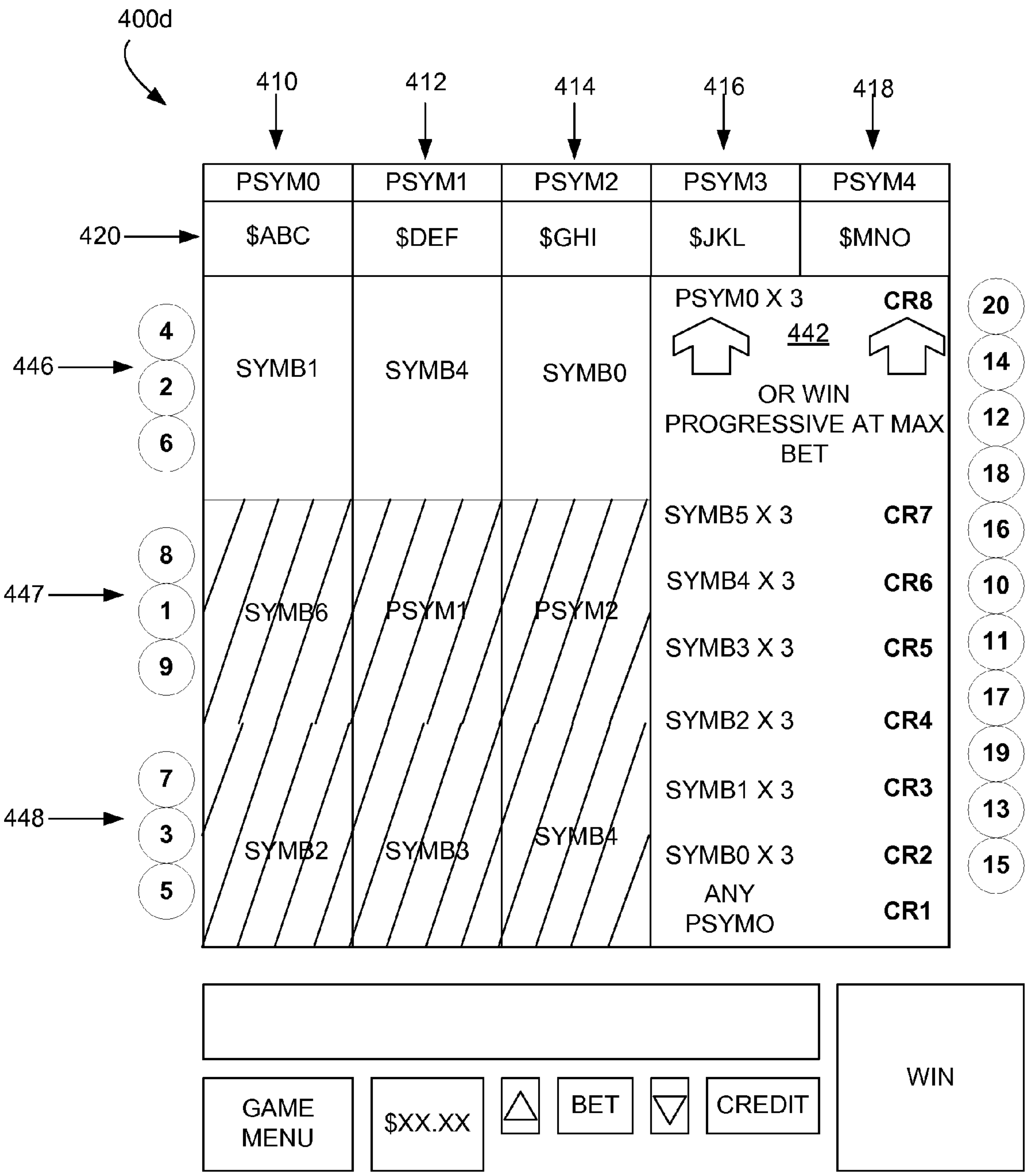
FIG. 4D is a screen diagram that illustrates a continuation of the session shown in FIG. 4C, where the player has played the first round of bonus play with no progressive winner.
Figure 4E:
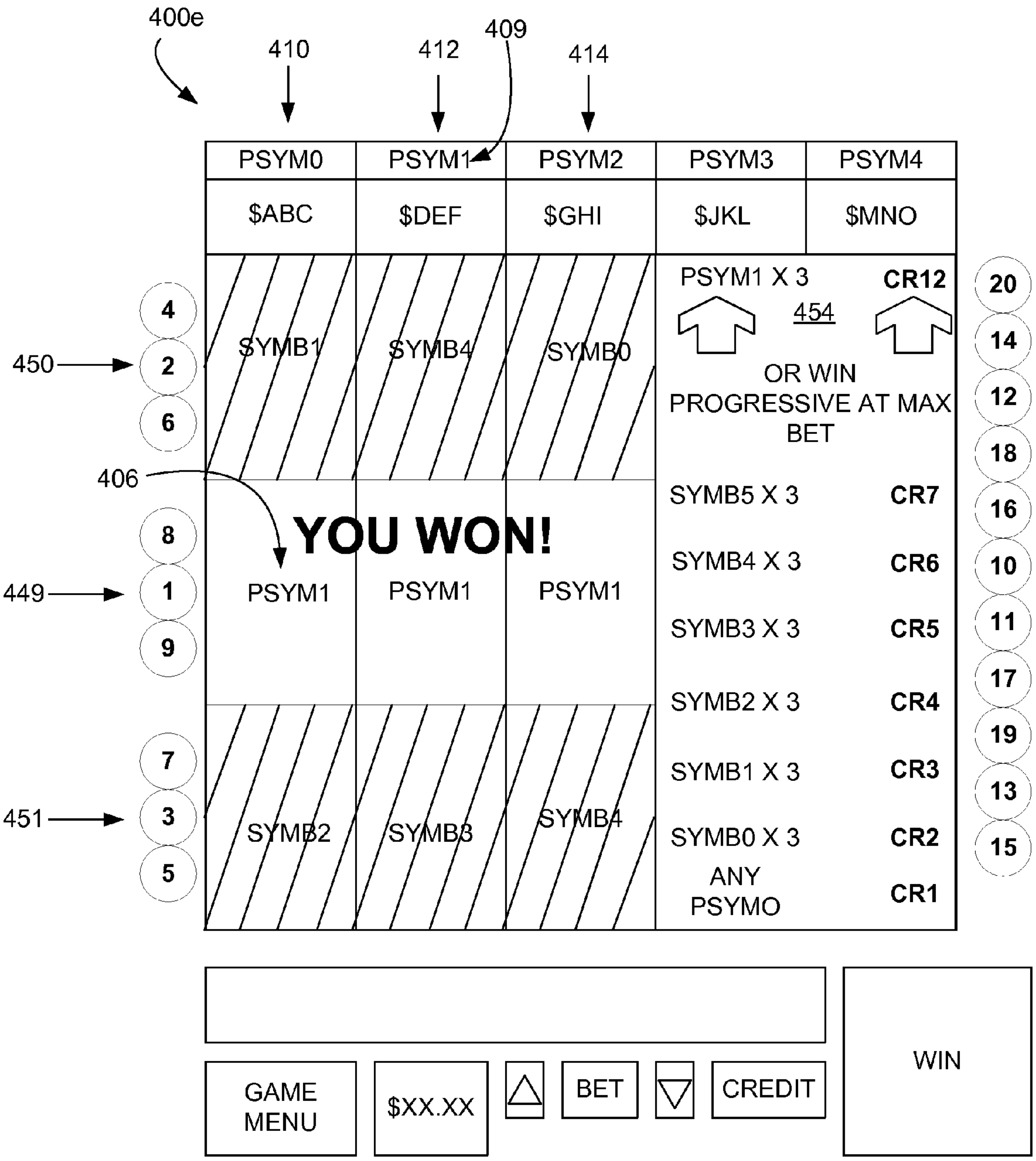
FIG. 4E is a screen diagram that illustrates a continuation of the session shown in FIG. 4D, where the player has played a second round of bonus play and has won a progressive award.

FIG. 4D is a GUI 400*d* that is presented responsive to a reel spin launched from the GUI 400*c* shown in FIG. 4C. In one implementation, as shown, when bonus play commences, the row 446 in which the progressive symbol (e.g., PSYM0) initially appeared to earn the bonus rounds (e.g., see GUI 400*b*, FIG. 4B) is highlighted or otherwise suggests to the player the row to be played. The other rows 447 and 448 (that did not include the progressive symbol, PSYM0) are grayed out or otherwise indicated as disabled for purposes of continued play for a given round. For instance, in FIG. 4D, disabled rows 447 and 448 are shown to be grayed out, representing to the player that the only row of interest for purposes of winning the progressive jackpot award and/or credits corresponding to progressive symbol PSYM0 406 (column 410) is bonus row 446 (e.g., the row in which PSYM0 appeared to win the bonus rounds). Alternatively, the center row 447 may be used, independent of which row the progressive symbol appeared in which case rows 446 and 448 would be disabled.

As shown in the example of FIG. 4D, none of the columns 410, 412 and 414 display the progressive symbol PSYM0 in the bonus row 446 as a result of the bonus reel spin, and hence a progressive award of $ABC shown in progressive jackpot award row 420 is not awarded to the player for this round. Similarly, no further credits are awarded, as indicated by progressive overlay 442.

It should be understood to one having ordinary skill in the art in the context of the present disclosure that, though the same symbols A-O appear in the progressive jackpot award row 420 throughout the exemplary GUIs 400 in FIGS. 4A-4E, as time progresses, the dollar amounts of one or more of the progressive awards in each column 410-418 are periodically (or continuously, in some embodiments) augmented (until there is a progressive jackpot win for a particular progressive, at which time the value of the winning progressive would be reset to a seed value) since wagers are continually made at local gaming machines 108 in the same location 102 as well as at remotely located gaming machines 108. Note that no other credits are earned during this bonus round (for column 410) since none of the patterns shown in the progressive overlay 442 are displayed in the bonus row 446. Accordingly, a player will "spin the reel" for the next progressive symbol (PSYM1) shown in column 412, with an exemplary result presented in GUI 400*e* shown in FIG. 4E.

As shown, progressive symbols 406 corresponding to column symbol 409 PSYM1 in column 412 are displayed in all three columns 410, 412, and 414 of bonus row 449, and accordingly, the progressive award of $DEF (assuming the player placed the maximum bet permissible, as described, above) is earned by the player (as reflected by the "YOU WON!" graphic overlaid on the bonus row 449). Note, as in FIG. 4D, the disabled rows 450 and 451 are grayed out or otherwise suggest to the player that each is not a part of this bonus round. The progressive overlay 454 informs the player as to the credits won.

An additional round pertaining to progressive symbol PSYM2 is also to be played in similar manner as described above.

Figure 5:
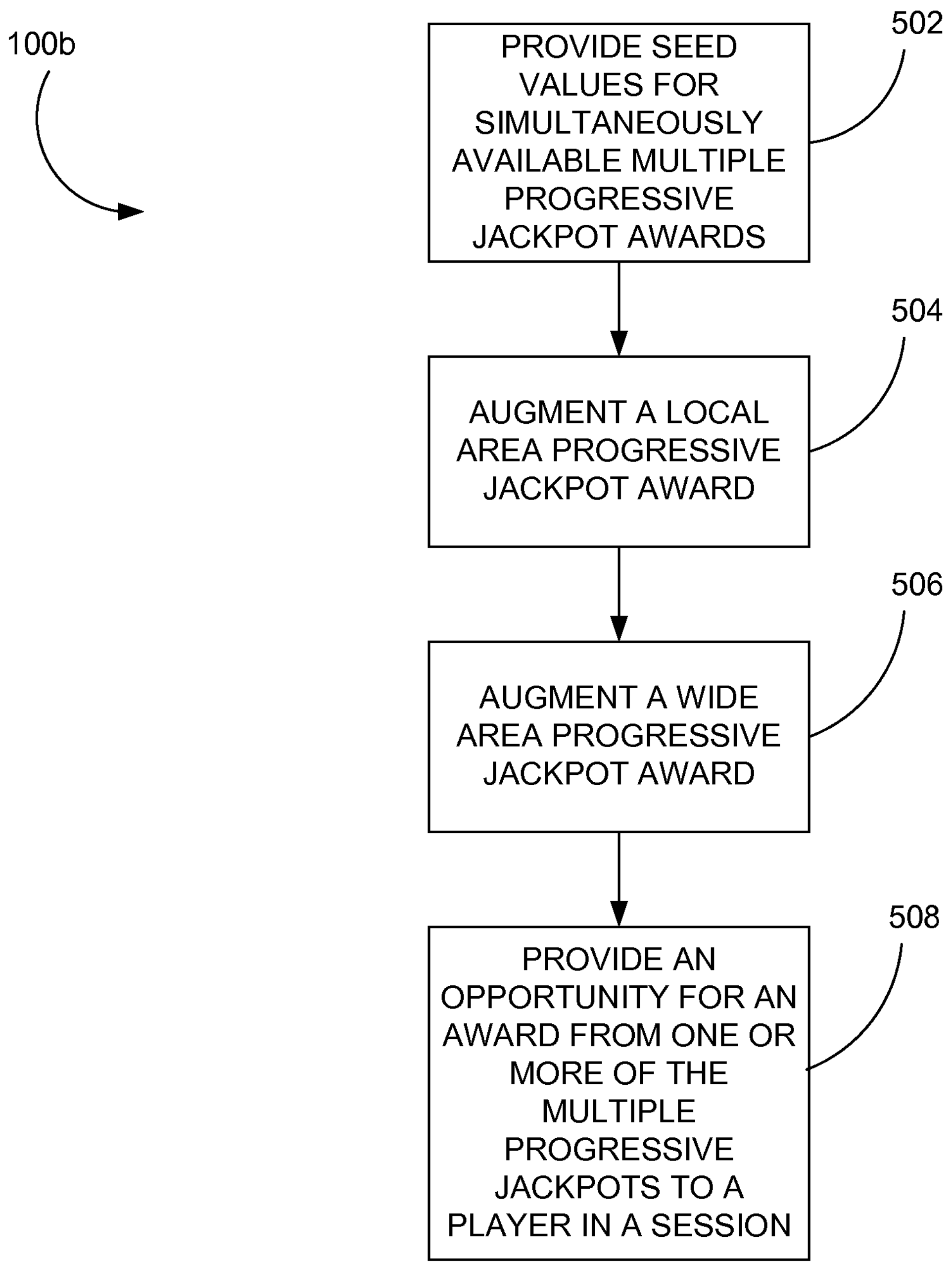
FIG. 5 is a flow diagram that illustrates an embodiment of a progressive gaming method.

Having described a session play through FIGS. 4A-4E for an exemplary video slots game, one progressive gaming method 100*b*, shown in FIG. 5, comprises providing seed values for simultaneously available multiple progressive jackpot awards (502), augmenting a local area progressive jackpot associated with gaming machines located at a first location (504) (e.g., local to the gaming machine currently being played), augmenting a wide area progressive jackpot based on data communicated over a WAN from gaming machines associated with remote locations (506), and providing an opportunity for one or more of the progressive jackpot awards corresponding to the award amounts displayed to a player in a session (508).

Figure 6:
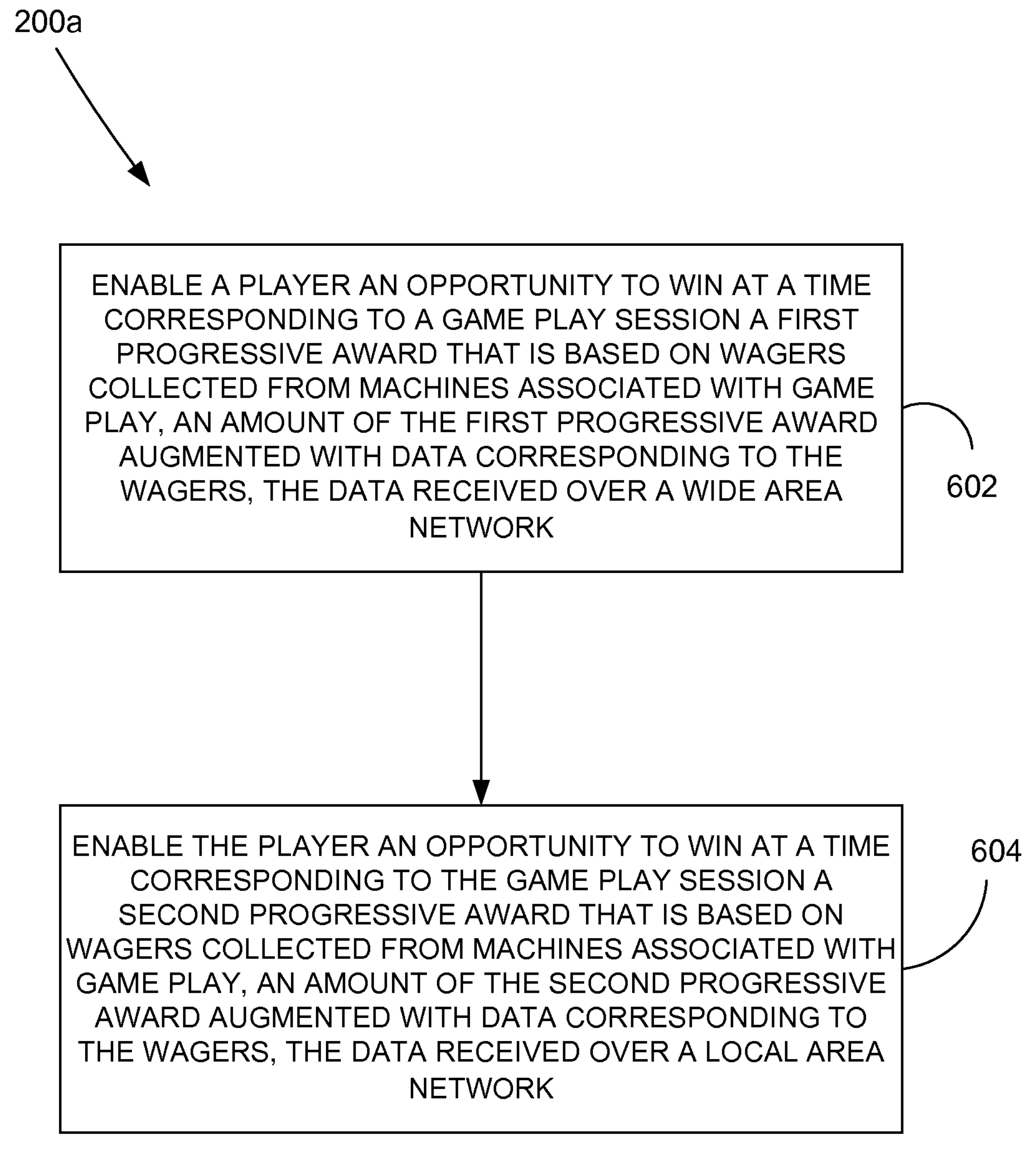
FIG. 6 is a flow diagram that illustrates another embodiment of a progressive gaming method.

Another embodiment denoted as progressive gaming method 200*a* and shown in FIG. 6, comprises enabling a player an opportunity to win at a time corresponding to a game play session a first progressive award that is based on wagers collected from machines associated with game play, an amount of the first progressive award augmented with data corresponding to the wagers, the data received over a wide area network (602), and enabling the player an opportunity to win at a time corresponding to the game play session a second progressive award that is based on wagers collected from machines associated with game play, an amount of the second progressive award augmented with data corresponding to the wagers, the data received over a local area network (604).

The flow diagrams of FIGS. 5 and 6 show the architecture, functionality, and operation of a possible implementation of the gaming system 100 (e.g., 100*a*) and the gaming software 200, respectively. In this regard, each block represents a module, segment, or portion of code, which comprises one or more executable instructions for implementing the specified logical function(s). It should also be noted that in some alternative implementations, the functions noted in the blocks may occur out of the order noted in FIGS. 5 and 6. For example, two blocks shown in succession in FIG. 5 may in fact be executed substantially concurrently or the blocks may sometimes be executed in the reverse order, depending upon the functionality involved, as will be further clarified herein below.

It should be emphasized that the above-described embodiments, particularly, any "preferred" embodiments, are merely possible examples of implementations, merely set forth for a clear understanding of the principles of the disclosure. Many variations and modifications may be made to the above-described embodiments without departing substantially from the spirit and principles of the disclosure. All such modifications and variations are intended to be included herein within the scope of this disclosure and protected by the following claims.

At least the following is claimed:

1. A method, comprising:

via a series of gaming machines linked via a local area network and a series of gaming machines linked via a wide area network, wherein each gaming machine includes at least a display and user interface, and is in communication with a local and/or remote processor:

enabling a player an opportunity to win at a time corresponding to a game play session a first progressive award based on wagers collected from machines associated with game play, an amount of the first progressive award augmented with data corresponding to the wagers, the data received over a wide area network;

enabling the player an opportunity to win at a time corresponding to the game play session a second progressive award based on wagers collected from machines associated with game play, an amount of the second progressive award augmented with data corresponding to the wagers, the data received over a local area network;

presenting on a primary game display a graphics user interface including game graphics, game symbol matrix, said amount of the first progressive award and said amount of the second progressive award; and presenting on said primary game display one or more progressive symbols relative to each column within said game symbol matrix and respective amounts of progressive awards including said amount of the first progressive award and said amount of the second progressive award.

2. The method of claim 1, further comprising simultaneously presenting on said primary game display said graphics user interface including a plurality of wide-area network based progressive award amounts, including the first progressive award amount.

3. The method of claim 1, further comprising simultaneously presenting on said primary game display said graphics user interface including a plurality of local-area network progressive award amounts, including the second progressive award amount.

4. The method of claim 1, further comprising presenting simultaneously on said primary game display said graphics user interface including a plurality of wide-area network based progressive award amounts, including the first progressive award amount, and presenting a plurality of local-area network progressive award amounts, including the second progressive award amount.

5. The method of claim 1, further comprising augmenting the first progressive award amount and the second progressive award amount periodically.

6. The method of claim 1, further comprising awarding the first progressive award, the second progressive award, or a combination of the first and second progressive awards based on one or more gaming events.

7. The method of claim 6, wherein the gaming events correspond to a video slot machine event.

8. The method of claim 1, wherein the first progressive award and the second progressive award correspond to a respective first progressive award amount and a second progressive award amount presented in separate columns of a matrix presented in a graphics user interface at a gaming machine.

9. The method of claim 1, wherein the first progressive award and the second progressive award correspond to a respective first progressive award amount and a second progressive award amount presented in separate columns of a matrix presented in a graphics user interface at a plurality of gaming machines.

10. The method of claim 9, wherein the plurality of gaming machines comprise a first plurality of gaming machines communicating over the wide area network to a second plurality of gaming machines.

11. A system, comprising:

a central operations server configured to provide data corresponding to a wide area progressive award amount to a plurality of game servers communicatively coupled to a wide area network (WAN), the wide area progressive award amount based on wager-related data received from the plurality of game servers coupled to the WAN;

a first game server of the plurality of game servers, the first game server communicatively coupled to the central operations server over the WAN, the first game server configured to provide first data corresponding to a local area progressive award amount to a plurality of gaming machines communicatively coupled to the first game server over a local area network (LAN), the local area progressive award amount based on wager-related data received from the plurality of gaming machines coupled to the LAN, the first game server further configured to provide second data corresponding to the wide area progressive award amounts to the plurality of gaming machines;

a graphics user interface presented on a primary game display, said graphics user interface including game graphics, game symbol matrix, the local area progressive award amount and the wide area progressive award amount; and presenting on said primary game display one or more progressive symbols relative to each column within said game symbol matrix and respective amounts of progressive awards including said amount of the first progressive award and said amount of the second progressive award.

12. The system of claim 11, further comprising a second game server of the plurality of game servers, the second game server communicatively coupled to the central operations server over the WAN, the second game server configured to provide third data corresponding to a local area progressive award amount to a plurality of gaming machines communicatively coupled to the second game server over a second local area network (LAN), the local area progressive award amount based on wager-related data received from the plurality of gaming machines coupled to the second LAN, the second game server further configured to provide fourth data corresponding to the wide area progressive award amounts to the plurality of gaming machines coupled to the second LAN.

13. The system of claim 11, further comprising a second gaming machine of the plurality of gaming machines coupled to the second LAN, the second gaming machine configured to provide a second graphics user interface that simultaneously presents the wide area progressive award amount and the local area progressive award amount that is also displayed on the first user interface.

* * * * *